United States Patent
Lim

(10) Patent No.: US 11,529,967 B2
(45) Date of Patent: Dec. 20, 2022

(54) DRIVER ASSISTANCE APPARATUS AND METHOD OF THEREOF

(71) Applicant: MANDO CORPORATION, Pyeongtaek-si (KR)

(72) Inventor: Sungyong Lim, Seoul (KR)

(73) Assignee: HL Klemove Corp., Incheon (KR)

( * ) Notice: Subject to any disclaimer, the term of this patent is extended or adjusted under 35 U.S.C. 154(b) by 0 days.

(21) Appl. No.: 17/341,969

(22) Filed: Jun. 8, 2021

(65) Prior Publication Data
US 2021/0380123 A1    Dec. 9, 2021

(30) Foreign Application Priority Data

Jun. 8, 2020    (KR) .................. 10-2020-0068837

(51) Int. Cl.
*H04N 5/44*     (2011.01)
*B60W 50/14*    (2020.01)
*B60W 40/105*   (2012.01)
*H04W 4/44*     (2018.01)

(52) U.S. Cl.
CPC .......... *B60W 50/14* (2013.01); *B60W 40/105* (2013.01); *H04W 4/44* (2018.02); *B60W 2050/143* (2013.01); *B60W 2050/146* (2013.01); *B60W 2420/42* (2013.01); *B60W 2555/60* (2020.02); *B60W 2556/40* (2020.02); *B60W 2556/45* (2020.02)

(58) Field of Classification Search
CPC .............. B60W 50/14; B60W 40/105; B60W 2050/143; B60W 2050/146; B60W 2420/42; B60W 2555/60; B60W 2556/40; B60W 2556/45; H04W 4/44
See application file for complete search history.

(56) References Cited

U.S. PATENT DOCUMENTS

| | | | |
|---|---|---|---|
| 6,462,675 B1 * | 10/2002 | Humphrey ....... | G08G 1/096775 340/936 |
| 2009/0243883 A1 * | 10/2009 | Simon .............. | G08G 1/096783 340/905 |
| 2017/0010117 A1 * | 1/2017 | Oh ...................... | G01C 21/3602 |
| 2017/0057355 A1 * | 3/2017 | Oikawa ............... | B60W 30/143 |
| 2017/0349097 A1 * | 12/2017 | Nishimura ........... | G06V 20/582 |
| 2018/0247532 A1 * | 8/2018 | Koyama ............. | G06V 20/582 |
| 2019/0049260 A1 * | 2/2019 | Gaither ................ | B60W 40/00 |
| 2020/0184812 A1 * | 6/2020 | Han ..................... | G06K 9/6269 |

* cited by examiner

*Primary Examiner* — Munear T Akki
(74) *Attorney, Agent, or Firm* — Morgan, Lewis & Bockius LLP

(57) ABSTRACT

Provided is An apparatus for assisting driving of a host vehicle, the apparatus comprising: a camera mounted to the host vehicle and having a field of view in front of the host vehicle, the camera configured to acquire image data; and a controller including a processor configured to process the image data, and configured to receive a map on which the host vehicle travels from a server, compare a speed limit included in the map with a speed limit included in the image data, and control a display of the host vehicle so as to display the speed limit based on the image data.

4 Claims, 8 Drawing Sheets

[FIG.1]
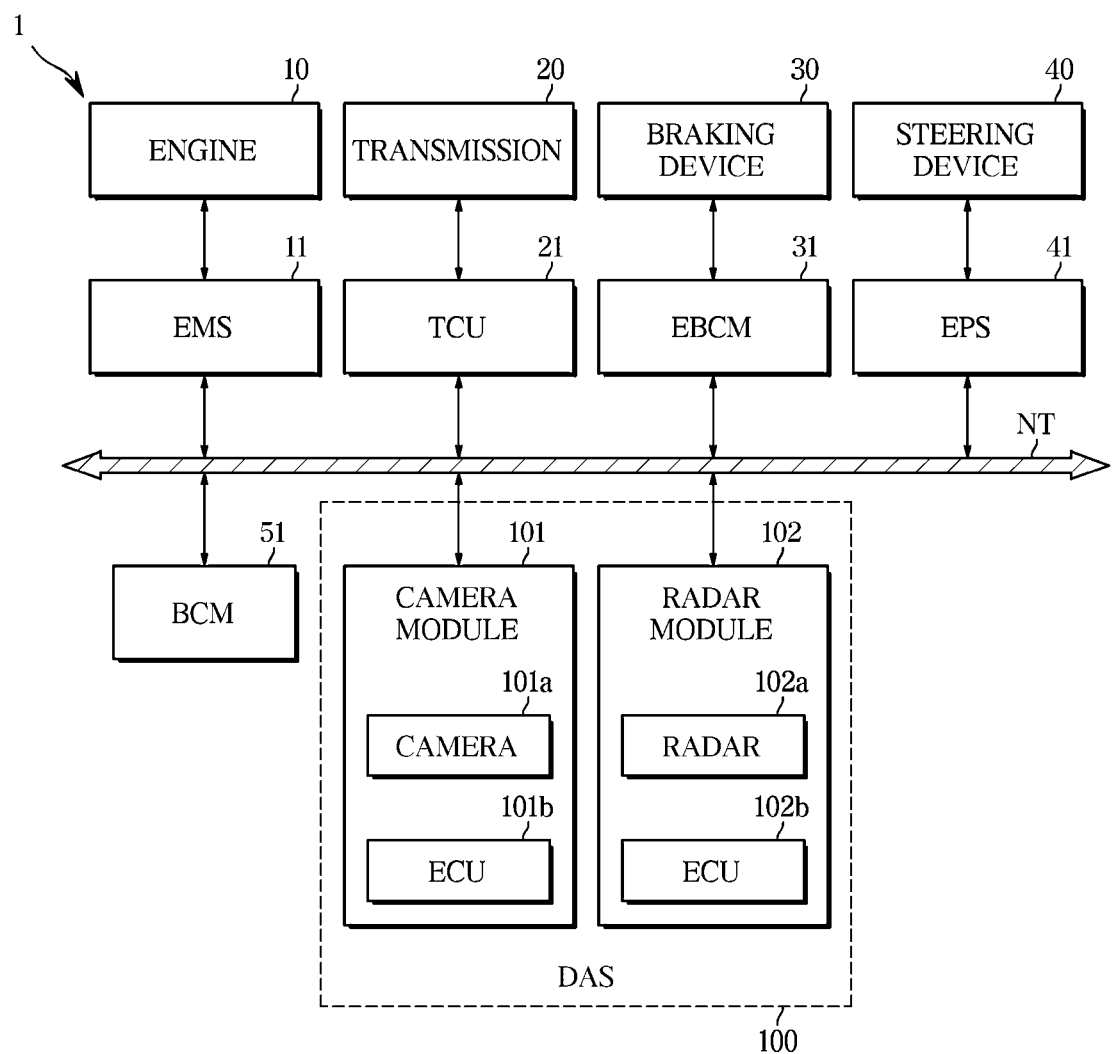

[FIG. 2]
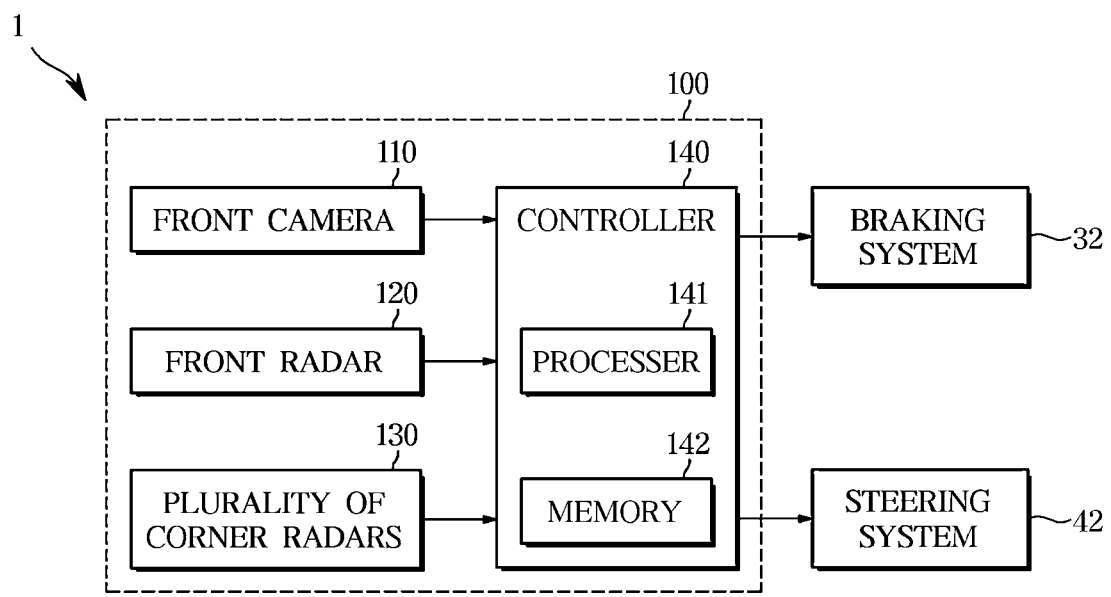

[FIG. 3]
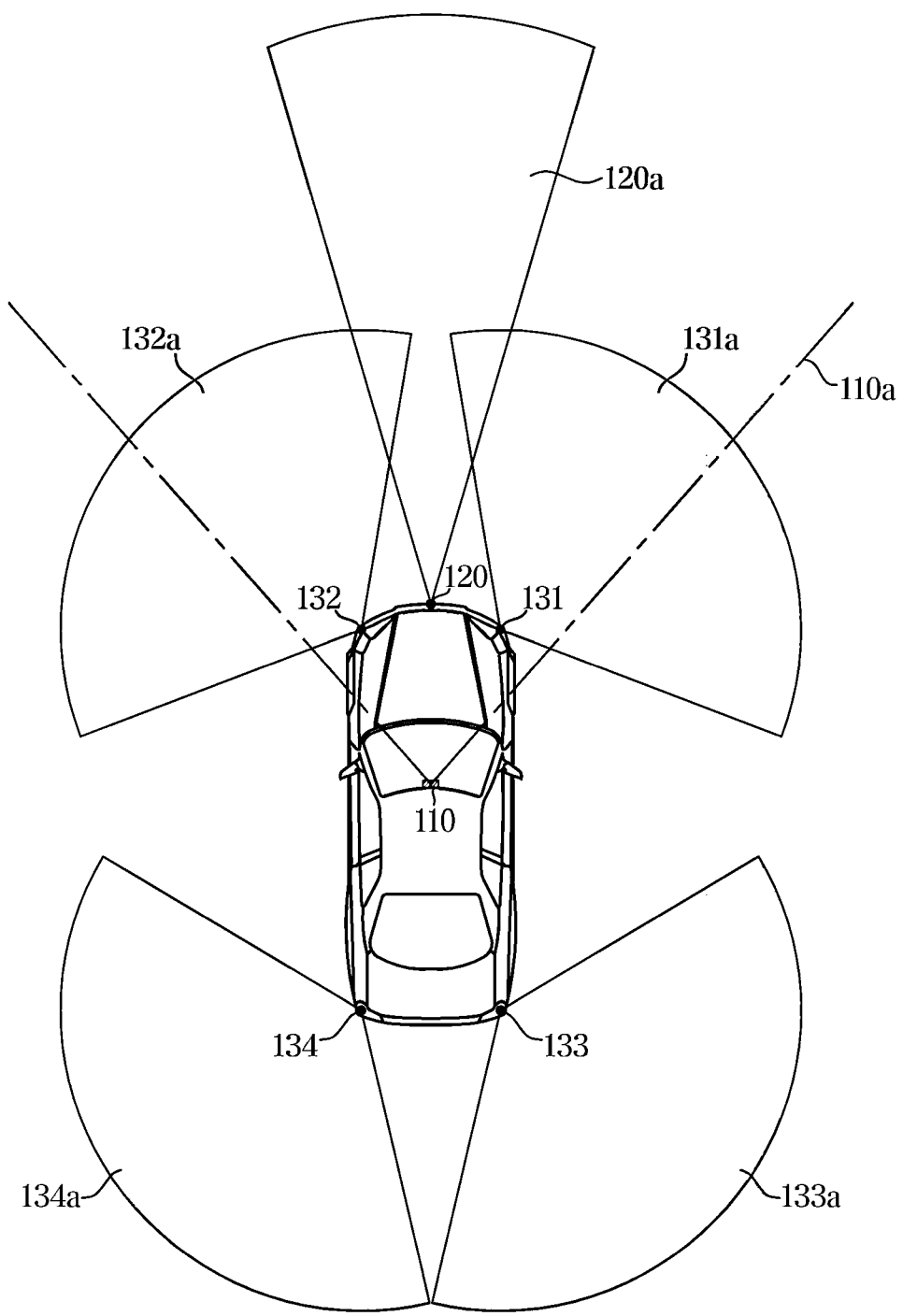

[FIG. 4]
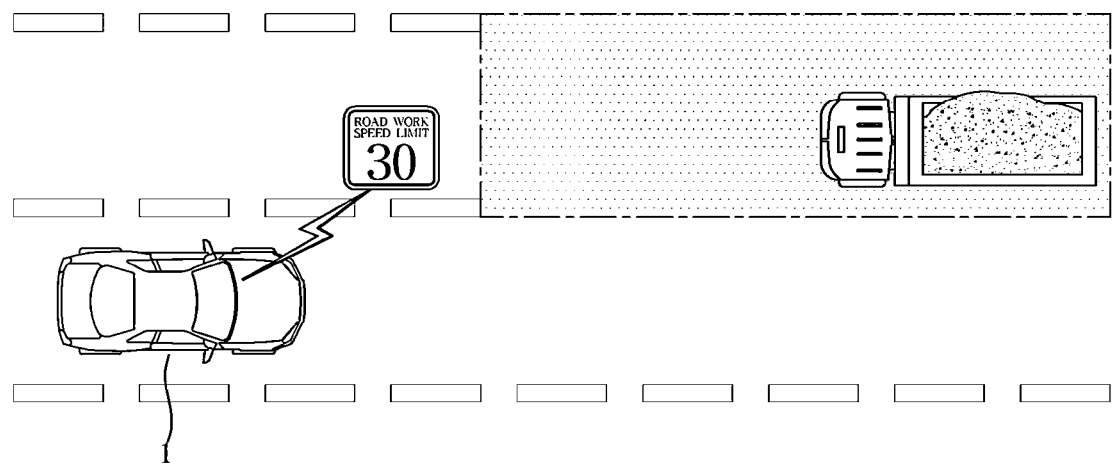
[FIG. 5]
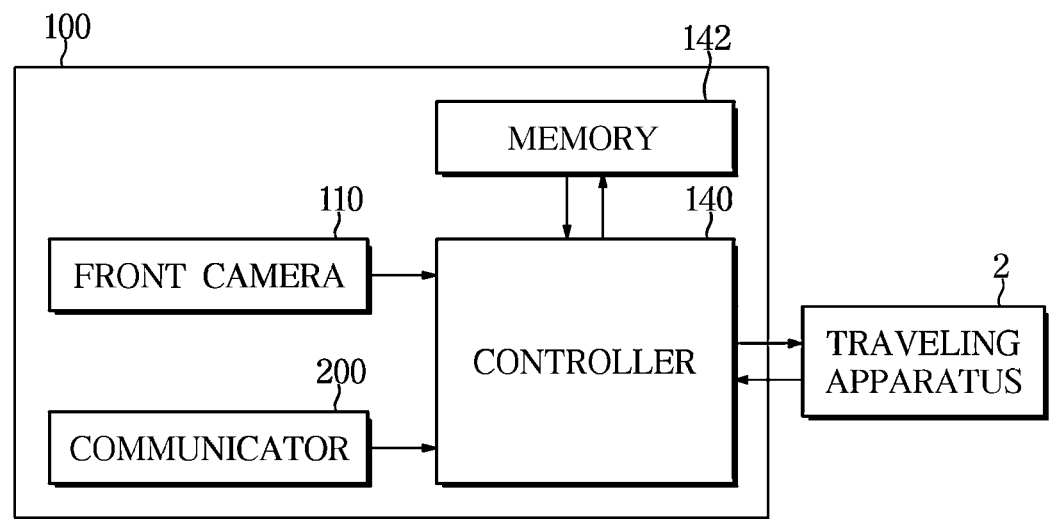

[FIG. 6]
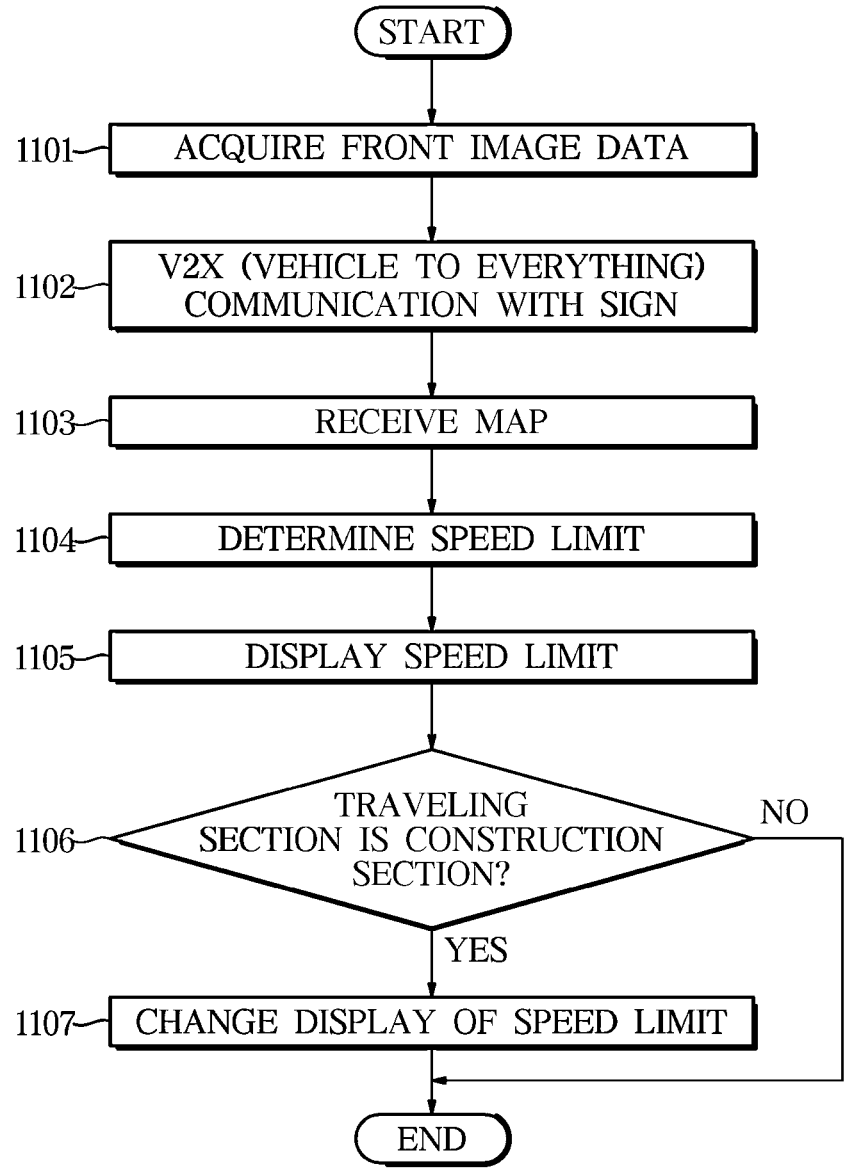

[FIG. 7]
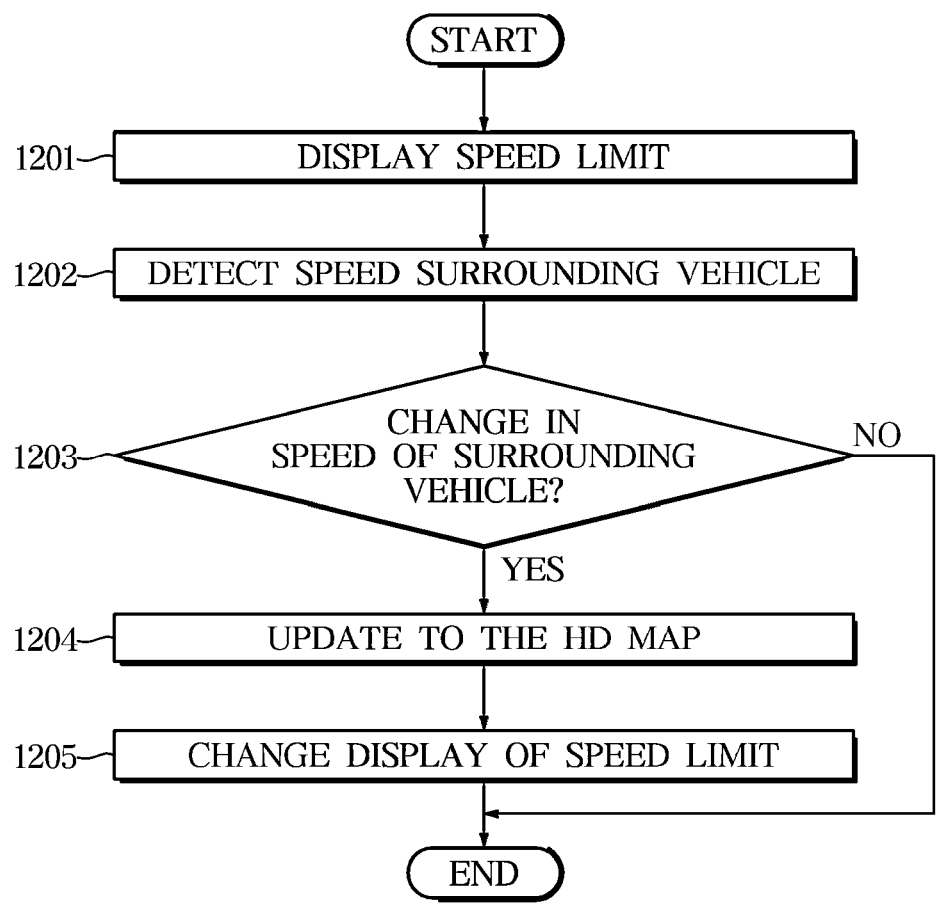

[FIG. 8]
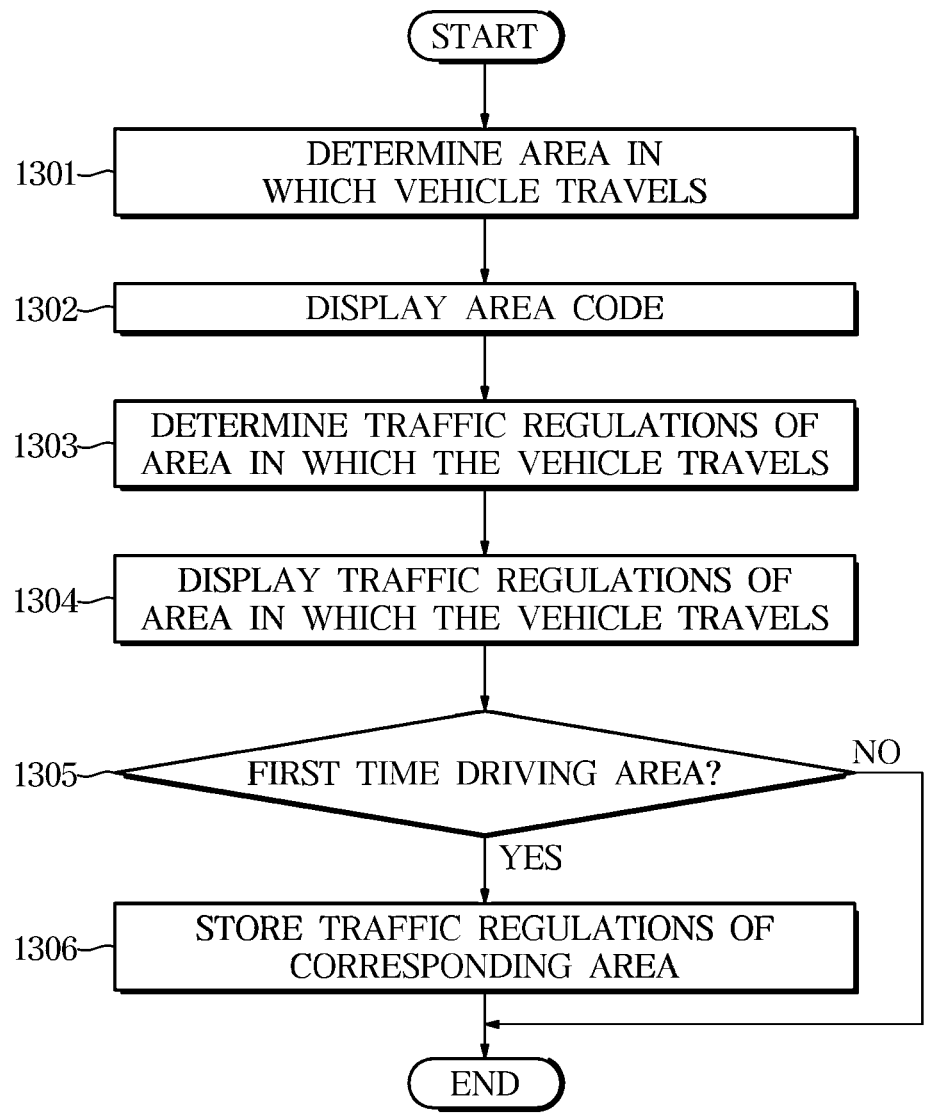

[FIG. 9]
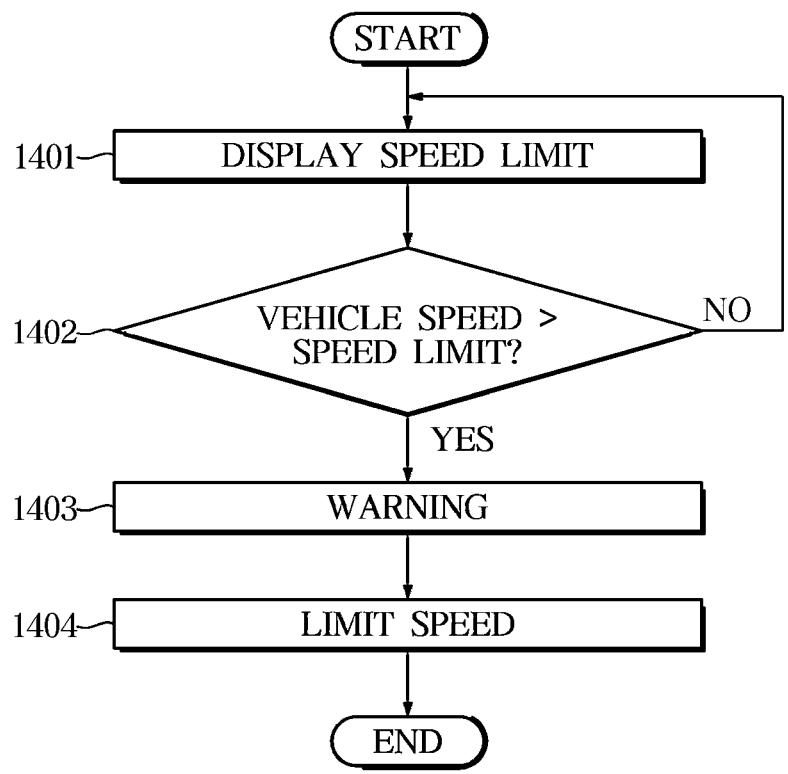

DRIVER ASSISTANCE APPARATUS AND METHOD OF THEREOF

CROSS-REFERENCE TO RELATED APPLICATION

This application is based on and claims priority under 35 U.S.C. § 119 to Korean Patent Application No. 10-2020-0068837, filed on Jun. 8, 2020 in the Korean Intellectual Property Office, the disclosure of which is incorporated herein by reference.

BACKGROUND

1. Field

The present disclosure relates to a driver assistance apparatus, a driver assistance method, and a driver assistance system. Specifically, the present disclosure relates to displaying a road speed limit acquired from image data or a vehicle to everything (V2X) communication result.

2. Description of the Related Art

A conventional navigation system or a front sign recognition system has been a system that simply recognizes a sign existing in front and displays the recognized information.

Therefore, the conventional navigation system or the front sign recognition system did not reflect the road speed limit that is temporarily changed in case of emergency repair or an unexpected situation of a road.

In addition, the conventional navigation system or the front sign recognition system has poor recognition performance for electronic signs.

SUMMARY

Therefore, it is an aspect of the present disclosure to provide a driver assistance apparatus, a driver assistance method, and a driver assistance system capable of determining a speed limit of a road and displaying the determined speed limit based on image data acquired by a camera and a result of V2X (Vehicle to Everything) communication with the road sign.

In accordance with one aspect of the present disclosure, there is provided an apparatus for assisting driving of a host vehicle, the apparatus comprising a camera mounted to the host vehicle and having a field of view in front of the host vehicle, the camera configured to acquire image data, and a controller including a processor configured to process the front image data, wherein the controller is configured to receive a map on which the host vehicle travels from a server, compare a speed limit included in the map with a speed limit included in the image data, and control a display of the host vehicle so as to display the speed limit based on the image data.

The controller may update a speed limit of a road on the map and display the speed limit on the map.

The controller may determine whether a traveling section is a construction section and change the displayed speed limit based on the determination result.

The controller may change the displayed speed limit based on a change in speed of a surrounding vehicle.

The controller may display an area code and a changed speed limit on the map, based on area information on which the host vehicle travels.

The apparatus for assisting driving of a host vehicle may further comprise a memory configured to store the area information, and the controller may store traffic regulations of an area in the memory and display the stored traffic regulations.

In response to determining that the host vehicle is traveling in excess of the speed limit, the controller may control an audio apparatus provided in the host vehicle to warn a user.

The controller may control a travelling apparatus so that the host vehicle travels at a speed less than the speed limit.

In accordance with one aspect of the present disclosure, there is provided a method for assisting driving of a host vehicle, the method comprising acquiring image data around the host vehicle, and processing the front image data, wherein the processing of the front image data includes receiving a map on which the host vehicle travels from a server; comparing the speed limit included in the map with a speed limit included in the image data; and controlling a display of the host vehicle to display the speed limit based on the image data.

In accordance with one aspect of the present disclosure, there is provided a system for assisting driving of a host vehicle, the system comprising a camera mounted to the host vehicle and having a field of view in front of the host vehicle, the camera configured to acquire image data, a communicator configured to perform V2X (Vehicle to Everything) communication with a sign provided on a road and a controller including a processor configured to process the front image data, wherein the controller is configured to: receive a map on which the vehicle travels from a server, compare a speed limit included in the map with at least one of a speed limit included in the image data or a speed limit received from the communication result, control a display of the host vehicle to display the speed limit based on the image data or the communication result.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of a configuration of a vehicle according to an embodiment.

FIG. 2 is a diagram illustrating a configuration of a driver assistance system according to an embodiment.

FIG. 3 is a diagram illustrating a camera and a radar included in a driver assistance system according to an embodiment.

FIG. 4 is a diagram illustrating that a driver assistance apparatus according to an aspect detects a road sign.

FIG. 5 is a control block diagram of a driver assistance apparatus according to an aspect.

FIG. 6 is a flowchart illustrating a process in which a controller according to an aspect changes display of a speed limit.

FIG. 7 is a flowchart illustrating that a controller according to the disclosed aspect changes display of a speed limit based on speed of the surrounding vehicle.

FIG. 8 is a flowchart illustrating a process of displaying a driving area code by a controller according to an aspect.

FIG. 9 is a flowchart illustrating a process in which a controller warns a user according to an aspect.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the operating principles and embodiments of the present invention will be described with reference to the accompanying drawings.

FIG. 1 illustrates a configuration of a configuration of a vehicle according to an embodiment.

Referring to FIG. 1, the vehicle 1 includes an engine 10, a transmission 20, a braking device 30, and a steering device 40. The engine 10 includes a cylinder and a piston, and may generate power for the vehicle 1 to travel. The transmission 20 includes a plurality of gears, and may transmit power generated by the engine 10 to a wheel. The braking device 30 may decelerate the vehicle 1 or stop the vehicle 1 through friction with the wheel.

The steering device 40 may change traveling direction of the vehicle 1. The vehicle 1 may include a plurality of electric components. For example, the vehicle 1 further includes an engine management system (EMS) 11, a transmission control unit (TCU) 21, an electronic brake control module 31, an electronic power steering (EPS) 41, a body control module (BCM), and a driver assistance system (DAS).

The EMS 11 may control the engine 10 in response to a driver's acceleration intention through an accelerator pedal or a request from the driver assistance apparatus 100 or the DAS. For example, the EMS 11 may control the torque of the engine 10.

The TCU 21 may control the transmission 20 in response to a driver's shift command through a shift lever and/or a driving velocity of the vehicle 1. For example, the TCU 21 may adjust a shift ratio from the engine 10 to the wheel.

The electronic braking control module 31 may control the braking device 30 in response to a driver's braking intention through a braking pedal and/or slip of wheels. For example, the electronic braking control module 31 may temporarily release the braking of the wheel in response to the slip of a wheel detected when the vehicle 1 is braking (Anti-lock Braking Systems, ABS). The electronic brake control module 31 may selectively release the braking of the wheel in response to oversteering and/or understeering detected when the vehicle 1 is steered (Electronic stability control, ESC). In addition, the electronic brake control module 31 may temporarily brake the wheel in response to the slip of the wheel detected when the vehicle 1 is driven (Traction Control System, TCS).

The EPS 41 may assist the operation of the steering device 40 so that a driver can easily manipulate the steering wheel in response to the driver's steering intention through the steering wheel. For example, the EPS 41 may assist the operation of the steering device 40 so as to reduce a steering force when driving at a low velocity or park, and increase the steering force when driving at a high velocity.

The BCM 51 may control the operation of electronic components that provide convenience to the driver or ensure safety of the driver. For example, the BCM 51 may control a head lamp, a wiper, a cluster, a multi-function switch, and a direction indicator lamp.

The driver assistance apparatus 100 or the DAS may assist the driver in manipulating (driving, braking, steering) the vehicle 1. For example, the driver assistance apparatus 100 or the DAS may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The driver assistance apparatus 100 or the DAS may provide various functions to the driver. For example, the driver assistance apparatus 100 or the DAS may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The driver assistance apparatus 100 or the DAS may include a camera module 101 for acquiring image data around the vehicle 1 and a radar module 102 for acquiring obstacle data around the vehicle 1. The camera module 101 may include a camera 101a and an electronic control unit (ECU) 101b, and may photograph the front of the vehicle 1 and recognize other vehicles, pedestrians, cyclists, lanes, road signs, and the like. The radar module 102 may include a radar 102a and an electronic control unit (ECU) 102b and may acquire relative positions and relative velocities of obstacles (e.g., other vehicles, pedestrians, cyclists, and the like) around the vehicle 1.

The driver assistance apparatus 100 or the DAS is not limited to the diagram illustrated in FIG. 1, and may further include a LiDAR configured to scan around the vehicle 1 and detect the obstacles.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like. For example, the driver assistance apparatus 100 or the DAS may transmit a driving control signal, a driving signal, and a steering signal to the EMS 11, the electronic braking control module 31, and the EPS 41 through a vehicle communication network NT, respectively.

FIG. 2 is a diagram illustrating a configuration of a DAS according to an embodiment. FIG. 3 is a diagram illustrating a camera and a radar included in a DAS according to an embodiment.

Referring to FIG. 2, the vehicle 1 may include a braking system 32, a steering system 42, and a driver assistance apparatus 100 or a DAS.

The braking system 32 may include the EBCM (31 in FIG. 1) and the braking device (30 in FIG. 1) described in conjunction with FIG. 1, and the steering system 42 may include the EPS (41 in FIG. 1) and the steering device (40 in FIG. 1).

The driver assistance apparatus 100 or the DAS may include a front camera 110, a front radar 120, and a plurality of corner radars 130.

The camera 110 may have a field of view 110a directed to the front of the vehicle 1 as shown in FIG. 3. The camera 110 may be installed, for example, on the front windshield of the vehicle 1.

The camera 110 may photograph image the front of the vehicle 1 and acquire image data regarding the front of the vehicle 1. The image data regarding the front of the vehicle 1 may include position with respect to another vehicle or pedestrian or cyclist or lane located in front of the vehicle 1.

The camera 110 may include a plurality of lenses and an image sensor. The image sensor may include a plurality of photodiodes for converting light into electrical signals, and the plurality of photodiodes may be arranged in a two-dimensional matrix.

The camera 110 may be electrically connected to a controller 140. For example, the front camera 110 may be connected to the controller 140 through a vehicle communication network NT, through a hard wire, or through a printed circuit board (PCB).

The camera 110 may transmit the image data of the front of the vehicle 1 to the controller 140.

The front radar 120 may have a field of sensing 120a directed to the front of the vehicle 1 as shown in FIG. 3. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle. The front radar 120 may acquire front radar data from the transmission radio waves transmitted by the transmission antenna and the reflection radio waves received by the reception antenna. Front radar data may include position information and velocity information regarding another vehicle, a pedestrian, or a cyclist located in front of the vehicle 1. The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1 as shown in FIG. 3. For example, the front radar 120 may be installed on the right side of a front bumper of the vehicle 1. The second corner radar 132 may have a field of sensing 132a directed to the front left side of the vehicle 1, and for example, may be installed on the left side of the front bumper of the vehicle 1. The third corner radar 133 may have a field of sensing 133a directed to the rear right side of the vehicle 1 and for example, may be installed on the right side of a rear bumper of the vehicle 1. The fourth corner radar 134 may have a field of sensing 134a directed to the rear left side of the vehicle 1 and for example, may be installed on the left side of the rear bumper of the vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance and velocity information regarding another vehicle, a pedestrian or a cyclist (hereinafter, referred to as "an obstacle") existing on the front right side of the vehicle 1. The second corner radar data may include distance information and velocity information regarding an obstacle existing on the front left side of the vehicle 1. The third and fourth corner radar data may respectively include distance and velocity information regarding an obstacle existing on the rear right side of the vehicle 1 and distance and velocity information regarding an object located on the rear left side of the vehicle 1, respectively.

Each of the first, second, third, and fourth corner radars 131, 132, 133 and 134 may be connected to the controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU 101b (see FIG. 1) of the camera module 101 (see FIG. 1) and/or the ECU 102b (see FIG. 1) of the radar module 102 (see FIG. 1), and/or a separate integrated ECU.

The controller 140 includes a processor 141 and a memory 142.

The processor 141 may process the front image data of the camera 110, the front radar data of the front radar 120, and the corner radar data of the plurality of corner radars 130, and generate a driving signal for controlling the braking system 32 and the steering system 42. For example, the processor 141 may include an image signal processor for processing the front image data of the camera 110 and/or a digital signal processor for processing radar data of the radars 120 and 130 and/or a micro control unit (MCU) for generating a braking signal and/or a steering signal.

The processor 141 may detect obstacles (e.g., another vehicle, a pedestrian, a cyclist, and the like) in front of the vehicle 1 based on the front image data of the camera 110 and the front radar data of the radar 120.

In detail, the processor 141 may acquire position (distance and direction) and relative velocity of the obstacles in front of the vehicle 1 based on the front radar data of the front radar 120. The processor 141 may acquire position (direction) and type information (for example, whether the obstacle is another vehicle, a pedestrian, a cyclist, or the like) of the obstacle existing in front of the vehicle 1 based on the front image data of the camera 110. Further, the processor 141 may match the obstacles detected by the front image data with the obstacles detected by the front radar data, and acquire the type information, the position and the relative velocity of the obstacles in front of the vehicle 1 based on a result of the matching.

The processor 141 may generate a braking signal and a steering signal based on the type information, the position, and the relative velocity of front obstacles.

For example, the processor 141 may calculate a time to collision (TTC) between the vehicle 1 and the front obstacle based on the position (distance) and the relative velocity of the front obstacles, and transmit a braking signal to the braking system 32 based on a result of comparing the TTC with a predetermined reference time.

As another example, the processor 141 may calculate a distance to collision (DTC) based on the relative velocity of front obstacles, and warn the driver of a collision or transmit a braking signal to the braking system 32 based on a result of comparing the DTC with distances to the front obstacles.

The processor 141 may acquire position (distance and direction) and relative velocity of the obstacles on the sides of the vehicle 1 (front right, front left, rear right, and rear left) based on corner radar data of the plurality of corner radars 130.

The processor 141 may transmit a steering signal to the steering system 42 based on the position (distance and direction) and the relative velocity of the obstacles on the sides of the vehicle 1.

For example, if a collision with the front obstacles is determined based on TTC or DTC, the processor 141 may transmit a steering signal to the steering system 42 to avoid collision with the front obstacles.

The processor 141 may determine whether to avoid a collision with the front obstacles by changing the traveling direction of the vehicle 1 based on the position (distance and direction) and the relative velocity of the obstacles on the sides of the vehicle 1. For example, if there is no obstacle located on the sides of the host vehicle 1, the processor 141 may transmit a steering signal to the steering system 42 in order to avoid a collision with the front obstacles. If the collision with the obstacles on the sides is not predicted after the steering of the host vehicle 1 based on the position (distance and direction) and the relative velocity of the obstacles on the sides, the processor 141 may transmit a steering signal to the steering system 42 to avoid a collision with the front obstacles.

If the collision with the obstacles on the sides is predicted after the steering of the host vehicle 1 based on the position (distance and direction) and the relative velocity of the obstacles on the sides, the processor 141 may not transmit a steering signal to the steering system 42.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The driver assistance apparatus 100 or the DAS is not limited to the diagram illustrated in FIG. 2, and may further include a LiDAR configured to scan around the vehicle 1 and detect obstacles.

As such, the controller 140 may transmit a braking signal to the braking system 32 based on whether a collision with the front obstacles is predicted. If the obstacles on the sides does not exist or the collision with the obstacles on the sides is not predicted, the controller 140 may transmit a steering signal to the steering system 42 to avoid a collision with the front obstacles. If a collision with the obstacles on the sides is predicted after steering, the controller 140 may not transmit a steering signal to the steering system 42.

FIG. 4 is a diagram illustrating that a driver assistance apparatus according to an aspect detects a road sign.

Referring to FIG. 4, the driver assistance apparatus 100 provided in the vehicle 1 may recognize a sign installed on a road and determine a speed limit. Further, the driver assistance apparatus 100 according to an aspect may determine whether a construction site or an emergency situation exists in a traveling section based on photographed road information. A detailed control process of the driver assistance apparatus 100 will be described in detail with reference to FIGS. 5 to 9.

FIG. 5 is a control block diagram of a driver assistance apparatus according to an aspect.

Referring to FIG. 5, the driver assistance apparatus 100 may include the camera 110 and the controller 140, and may include a communicator 200 or a memory 142. Further, the controller 140 controls a traveling apparatus 2 provided in the vehicle 1.

Here, the traveling apparatus 2 includes the engine 10, the transmission 20, the braking device 30, and the steering device 40.

The camera 110 according to the disclosed embodiment is installed in the vehicle 1, photographs an image around the vehicle 1, and acquires image data.

Here, the image data may include sign information on a road, traffic condition information, speed information of surrounding vehicle, or road condition information, but is not limited thereto.

The communicator 200 according to an aspect may perform V2X (Vehicle to Everything) communication with a sign provided on the road and receive speed limit information.

Specifically, when a road condition is displayed on a sign, the communicator 200 may receive the displayed road condition information. Here, the road situation information may be information on whether a construction site exists on the road, whether an emergency situation has occurred on the road, or whether a special situation of changing the speed limit has occurred on the road, but is not limited thereto.

The controller 140 according to an aspect may receive a map of an area in which the vehicle 1 travels from an external server, and control a display (not shown) to display the speed limit of the road on the display (not shown) provided in the vehicle 1 based on the image data acquired by the camera 110.

Here, the display (not shown) provided on the vehicle 1 may be a cluster, a user terminal, an audio video navigation (AVN), or a head up display (HDU), but is not limited thereto.

Further, the controller 140 may combine and display the received map and the speed limit of the road. Here, the map may be a high definition map, but is not limited thereto.

Further, the controller 140 may determine whether the traveling section is a construction section, change the displayed speed limit based on the determination result, and change the displayed speed limit based on a change in speed of surrounding vehicle.

Further, the controller 140 may determine the position information of the vehicle 1 and determine area information in which the vehicle 1 is traveling.

Further, the controller 140 may display an area code and the changed speed limit on the display (not shown) provided in the vehicle 1 based on the determined area information.

Further, the controller 140 may store the area information of a traveling area in the memory 142. Here, the area information may be a traffic regulation, a speed limit, or a road situation of a corresponding area, but is not limited thereto.

Further, the controller 140 may compare current speed and speed limit of the vehicle 1.

In response to determining that the vehicle 1 is traveling in excess of the speed limit, the controller 140 may control at least one of a plurality of devices provided in the vehicle 1 to warn the user, and control the traveling apparatus 2 to travel at a speed less than the limit speed.

Further, the controller 140 may include a communication module that communicates with an external server, and the communication module may include one or more components that enable communication with an external device, and may include, for example, at least one of a short-range communication module, a wired communication module, and a wireless communication module.

The short-range communication module may include various short-range communication modules that transmit and receive signals using a wireless communication network in a short range, such as a Bluetooth module, an infrared communication module, a Radio Frequency Identification (RFID) communication module, a Wireless Local Access Network (WLAN) communication module, an NFC communication module, a Zigbee communication module, and the like.

The wired communication modules may include not only various wired communication modules such as such as Controller Area Network (CAN) communication modules, Local Area Network (LAN) modules, Wide Area Network (WAN) modules, or Value Added Network (VAN) modules, but also various cable communication modules such as Universal Serial Bus (USB), High Definition Multimedia Interface (HDMI), Digital Visual Interface (DVI), recommended standard232 (RS-232), power line communication, or plain old telephone service (POTS).

The wireless communication module may include a wireless communication module supporting various wireless communication methods such as Global System for Mobile Communication (GSM), Code Division Multiple Access (CDMA), Wideband Code Division Multiple Access (WCDMA), universal mobile telecommunications system (UMTS), Time Division Multiple Access (TDMA), Long Term Evolution (LTE) and the like in addition to a Wi-Fi module and a Wi-Bro module.

The wireless communication module may include a wireless communication interface including an antenna and a transmitter for transmitting signals. Further, the wireless communication module may further include a signal conversion module for modulating a digital control signal output from the controller into an analog type wireless signal through a wireless communication interface according to control of the controller.

The wireless communication module may include a wireless communication interface including an antenna and a receiver for receiving signals. Further, the wireless communication module may further include a signal conversion module for demodulating an analog wireless signal received through the wireless communication interface into a digital control signal.

The memory 142 according to the disclosed embodiment stores area information.

Specifically, the memory 142 may store and update traffic regulations of the area in which the vehicle 1 travels. Further, the memory 142 may store a control process of the controller 140 and provide feedback this to the user. Further, the memory 142 may store and update a map received from an external server. Here, the map may be an HD map, but is not limited thereto.

At least one component may be added or deleted according to the performance of the components of the driver assistance apparatus 100 illustrated in FIG. 5. Further, it will be easily understood by those of ordinary skill in the art that the mutual positions of the components may be changed corresponding to the performance or structure of the system.

Meanwhile, each component illustrated in FIG. 5 refers to software and/or hardware components such as Field Programmable Gate Array (FPGA) and Application Specific Integrated Circuit (ASIC).

Hereinafter, an embodiment of the control process of the controller 140 will be described.

FIG. 6 is a flowchart illustrating a process in which a controller according to an aspect changes display of a speed limit.

Referring to FIG. 6, the camera 110 acquires front image data, and the controller 140 receives the acquired image data (1101).

Further, the communicator 200 may perform V2X (Vehicle to Everything) communication with a sign existing on the road, and acquire speed limit information included in the sign (1102).

Further, the controller 140 may receive a map from an external server (1103). Here, the map may be an HD map, but is not limited thereto.

In response to acquiring front image data, performing V2X communication with a sign, and receiving a map, the controller 140 determines the speed limit of the road (1104).

Specifically, speed limit information included in the received map, speed limit information extracted from image data, or speed limit information acquired through V2X communication may be different. Here, if the speed limit information included in the received map, the speed limit information extracted from the image data, or the speed limit information acquired through V2X communication are different, the speed limit information acquired through V2X communication may be determined as the speed limit. However, the priority of the above-described information may vary according to user definition.

For example, the controller 140 receives a map on which the vehicle 1 travels from the server, compares a speed limit included in the received map with a speed limit included in image data photographed by the camera 110, and control a display (not shown) provided in the vehicle 1 to display the speed limit based on the image data photographed by the camera 110.

In response to the speed limit of the road on which the vehicle 1 travels being determined, the controller 140 controls the display (not shown) to display the speed limit on the display (not shown) provided in the vehicle 1 (1105).

As described above, the display (not shown) may be a cluster provided in the vehicle 1, a user terminal, an AVN, or a Head Up Display (HDU), but is not limited thereto.

In response to the speed limit being displayed on the display (not shown) provided in the vehicle 1, the controller 140 may determine whether the traveling section is a construction section (1106).

Specifically, if the sign exists on the road, the controller 140 may determine whether the traveling section is a construction section based on the image data acquired by the camera 110, updated map information, or V2X communication results.

Further, if the sign does not exist on the road, the controller 140 may determine whether the traveling section is a construction section based on the image data acquired by the camera 110 or updated map information.

In response to determining that the traveling section is a construction section, the controller 140 controls the display (not shown) to change the display of the speed limit (1107). Here, if the sign does not exist on the road, the controller 140 may display the speed limit of the construction section as the speed limit of the vehicle 1 based on the pre-stored area degree.

However, in response to determining that the traveling section is not a construction section, the controller 140 continues to display the speed limit.

FIG. 7 is a flowchart illustrating that a controller according to the disclosed aspect changes display of a speed limit based on speed of the surrounding vehicle.

The controller 140 controls the display (not shown) to display the determined speed limit (1201).

The driver assistance apparatus 100 according to the disclosed embodiment detects speed of the surrounding vehicle (1202), and the controller 140 determines the detected speed of the surrounding vehicle.

Specifically, the controller 140 may determine a change in the speed of the surrounding vehicle (1203).

Here, in response to determining that the speed change of the surrounding vehicle is greater than or equal to a preset reference, the controller 140 may update the speed change of the vehicle 1 to the HD map (1204).

Specifically, the preset reference may be the case where the speed limit information included in the HD map and the average speed of the surrounding vehicles are 10 km/h or more, but are not limited thereto. Further, the preset reference may vary according to user definition.

In response to the speed limit information being updated, the controller 140 may change the display of the speed limit (1205).

Specifically, the controller 140 may control the display (not shown) to display the updated information on the display (not shown) provided in the vehicle 1, and display the updated information in combination with the received HD map.

However, in response to determining that there is no change in the speed of the surrounding vehicle or the speed change value is less than or equal to the preset reference, the controller 140 ends the control process without changing the display of the speed limit.

FIG. 8 is a flowchart illustrating a process of displaying a driving area code by a controller according to an aspect.

The controller 140 according to the disclosed embodiment may determine an area in which the vehicle 1 travels (1301).

Specifically, the controller 140 may determine a traveling area of the vehicle 1 based on image data acquired by the camera 110, a V2X communication result, or a detection result of a GPS sensor provided in the vehicle 1.

In response to the traveling area of the vehicle 1 is determined, the controller 140 may control the display (not shown) so that an area code of the traveling area is displayed on the display (not shown) provided in the vehicle 1 (1302).

As described above, the display (not shown) may be a cluster, a user terminal, an AVN, or an HDU provided in the vehicle 1, but is not limited thereto.

In response to the traveling area code being displayed, the controller 140 determines traffic regulations of the area in which the vehicle 1 travels (1303), and displays the determined traffic regulations (1304).

Here, the traffic regulations may include a speed limit, a driving direction, a punishment level in case of violating traffic regulations, or a speed limit in a construction section, but are not limited thereto. The information of the displayed traffic regulations may further include other information that may affect the driving of the vehicle 1.

Further, the controller 140 may determine whether the traveling area is an area in which the vehicle 1 travels for the first time (1305).

In response to determining that the traveling area is the first traveling area, the controller 140 may store the traffic regulations of the traveling area in the memory 142 (1306).

Specifically, the controller 140 may extract traffic regulation information from image data acquired by the camera 110, a V2X communication result, or received map information, and store the extracted traffic regulation information in the memory 142.

FIG. 9 is a flowchart illustrating a process in which a controller warns a user according to an aspect.

The controller 140 according to the disclosed embodiment displays the speed limit on the display (not shown) provided in the vehicle 1 (1401).

Further, the controller 140 may compare the displayed speed limit with a current speed of the vehicle 1 (1402).

Specifically, in response to determining that the speed of the vehicle 1 exceeds the displayed speed limit, the controller 140 may control a plurality of apparatuses provided in the vehicle 1 to warn the user (1403).

Here, the plurality of apparatuses provided in the vehicle 1 may be audio, steering wheel, display, cluster, AVN, accelerator pedal, or brake pedal, but are not limited thereto.

For example, in response to determining that the current speed of the vehicle 1 exceeds the displayed speed limit, the controller 140 may control the audio provided in the vehicle 1 to generate a warning sound in the audio.

Further, in response to determining that the current speed of the vehicle 1 exceeds the limit speed, the controller 140 may control the steering wheel or the pedal provided in the vehicle 1 to vibrate.

Further, in response to determining that the current speed of the vehicle 1 exceeds the speed limit, the controller 140 may control the display (not shown) provided on the vehicle 1 to display a warning display.

Further, in response to determining that the current speed of the vehicle 1 exceeds the speed limit, the controller 140 may control the traveling apparatus 2 so that the vehicle 1 does not travel beyond the speed limit (1404).

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A system for assisting driving of a host vehicle, the system comprising:
    a camera mounted to the host vehicle and having a field of view in front of the host vehicle, the camera configured to acquire image data; and
    a communicator configured to perform V2X (Vehicle to Everything) communication with a sign provided on a road; and
    a controller including a processor configured to process the image data, and configured to:
    receive a map on which the host vehicle travels from a server,
    compare a speed limit included in the map with at least one of a speed limit included in the image data or a speed limit received from the communicator configured to perform V2X communication with the sign provided on the road, and
    control a display of the host vehicle based on the comparison to display the speed limit included in the image data or the speed limit received from the communicator.

2. The system of claim 1, wherein the controller is configured to update and display the speed limit included in the map.

3. The system of claim 1, wherein the controller is configured to determine whether a traveling section is a construction section and to change the displayed speed limit based on the determination result.

4. The system of claim 1, further comprising a memory configured to store area information,
    wherein the controller is configured to store traffic regulations of the area in the memory based on the area information on which the vehicle travels, and to display the stored traffic regulations.

* * * * *